United States Patent
Leonard et al.

(10) Patent No.: US 12,478,431 B2
(45) Date of Patent: Nov. 25, 2025

(54) PROVIDING SURGICAL ASSISTANCE VIA AUTOMATIC TRACKING AND VISUAL FEEDBACK DURING SURGERY

(71) Applicant: Asensus Surgical US, Inc., Durham, NC (US)

(72) Inventors: Zachary S Leonard, Raleigh, NC (US); Kevin Andrew Hufford, Cary, NC (US)

(73) Assignee: Asensus Surgical US, Inc., Durham, NC (US)

( * ) Notice: Subject to any disclaimer, the term of this patent is extended or adjusted under 35 U.S.C. 154(b) by 850 days.

(21) Appl. No.: 17/368,753

(22) Filed: Jul. 6, 2021

(65) Prior Publication Data

US 2022/0000559 A1    Jan. 6, 2022

Related U.S. Application Data

(60) Provisional application No. 63/048,181, filed on Jul. 5, 2020.

(51) Int. Cl.
*A61B 34/10* (2016.01)
*A61B 17/04* (2006.01)
(Continued)

(52) U.S. Cl.
CPC .......... *A61B 34/10* (2016.02); *A61B 17/0469* (2013.01); *A61B 34/25* (2016.02);
(Continued)

(58) Field of Classification Search
CPC ...................... A61B 17/0469; A61B 2034/107
See application file for complete search history.

(56) References Cited

U.S. PATENT DOCUMENTS 9,901,401 B2    2/2018   Yoon
2006/0020272 A1*   1/2006   Gildenberg ........ A61B 17/0469
                                                                606/144

(Continued)

FOREIGN PATENT DOCUMENTS

WO    2013132501 A1   9/2013
WO    2017098503 A1   6/2017
WO    2017098507 A1   6/2017

OTHER PUBLICATIONS

L. Pan et al., "Integration and evaluation of a gradient-based needle navigation system for percutaneous MR-guided interventions", PLoS ONE, vol. 15, No. 7, pp. 1-14, Mar. 2020 (Year: 2020).*

*Primary Examiner* — Joel Lamprecht
*Assistant Examiner* — Nyrobi Celestine

(57) ABSTRACT

A system and method for providing visual assistance to a practitioner during a medical suturing procedure. Real time images of the suture site are captured and displayed on an image display. The images are analyzed in real time to detect the suture needle, suture penetration sites, relevant tissue, adjacent tissue edges or other features of interest in the visual images. Based on the orientation of, or relationship between, the detected features of interest, overlays are generated and displayed on the image display to inform the user about the suturing task that is underway, such as the anticipated needle path, the suture spacing, or the separation between sutures and adjacent tissue edges.

8 Claims, 6 Drawing Sheets

User interface showing overlay on hernia to be closed, suture path and needle target entrance

(51) Int. Cl.
*A61B 34/00* (2016.01)
*A61B 34/20* (2016.01)
*A61B 90/00* (2016.01)

(52) U.S. Cl.
CPC ... *A61B 2034/104* (2016.02); *A61B 2034/105* (2016.02); *A61B 2034/107* (2016.02); *A61B 2034/2065* (2016.02); *A61B 2034/254* (2016.02); *A61B 2090/061* (2016.02)

(56) References Cited

U.S. PATENT DOCUMENTS

| | | |
|---|---|---|
| 2008/0108873 A1 | 5/2008 | Gattani et al. |
| 2017/0348067 A1* | 12/2017 | Krimsky ................. A61B 5/066 |
| 2020/0015901 A1* | 1/2020 | Scheib ................. A61B 5/6886 |
| 2020/0138518 A1* | 5/2020 | Lang ................. A61B 17/1666 |
| 2021/0015351 A1* | 1/2021 | Atarot ................... A61B 34/35 |
| 2022/0047339 A1* | 2/2022 | Prior ........................ A61B 1/05 |
| 2023/0045709 A1* | 2/2023 | Tal .......................... A61B 90/13 |

* cited by examiner

User interface showing overlay on hernia to be closed, suture path and needle target entrance User interface showing overlay on hernia to be closed, needle target exit and suture position detection User interface showing overlay on hernia to be closed, suture position assessment User interface showing overlay on hernia to be closed, suture placement recommendation

PROVIDING SURGICAL ASSISTANCE VIA AUTOMATIC TRACKING AND VISUAL FEEDBACK DURING SURGERY

BACKGROUND

Accurate placement of sutures in surgery contributes to optimal healing and hold strength, and helps to minimize suture complications such as minimize tear out, etc. A key challenge during suturing is accurate placement of the needle in the tissue. When using an articulated needle driver, for instance, the resulting motion of the needle may not be immediately obvious. When suturing is observed under 2D visualization, the challenge can be greater due to the lack of depth perception. In current practice, a practitioner may insert a needle inserted into tissue and then recognize that it is not optimally positioned or oriented once it has already passed through the tissue layer or layers. The needle is thus withdrawn from the tissue, repositioned and/or reoriented, and then inserted again into tissue with the goal of optimal placement.

This application describes a system and method that can optimize suture placement and enhance the efficiency of the suturing process.

DETAILED DESCRIPTION

Figure 1:
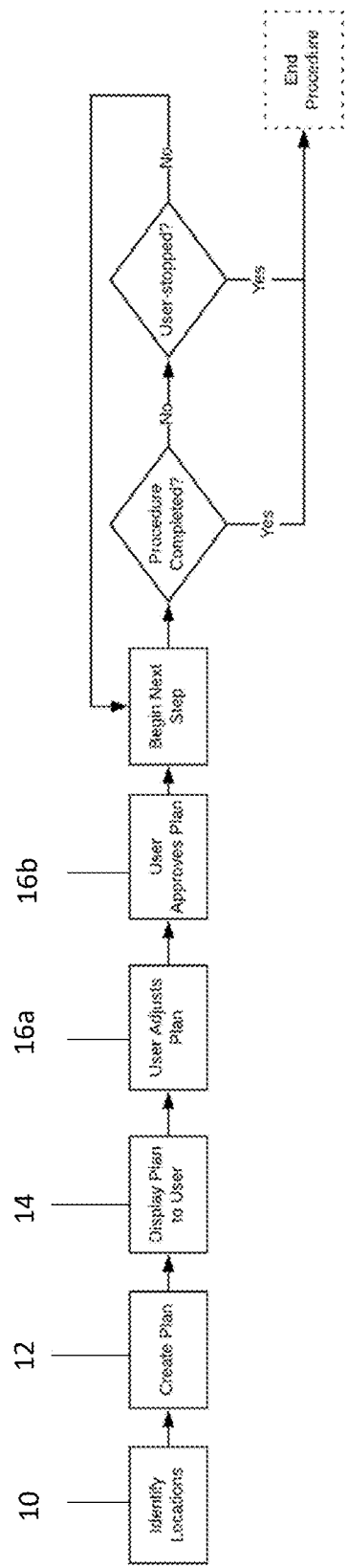
FIG. 1 is a sequence of steps schematically illustrating a planning feature that may be implemented in combination with the described features.

A system and method disclosed in this application improve on the current suturing practices by providing means for planning, executing, and providing cueing information to the user, ensuring that clinical metrics are satisfied during the suturing process. Needle path planning, suture location detection, and suture placement recommendations can be used to improve the efficacy of suturing. This information can be displayed to the user through overlays for manual suturing or could be used for a semi-autonomous or autonomous task execution. The features can be implemented using some combination of computer vision, intelligent scene cognition, and/or user selection. In some examples, computer vision or intelligent scene cognition is used to recognize the suture needle and/or needle holder in the endoscopic view. The described features are particularly useful for robotic-assisted surgery, where the user is causing a robotic manipulator to position and manipulate instruments (including suture instruments) by giving input using input devices at a surgeon console, or in systems in which the user provides supervisory oversight in a supervised autonomy mode or in a semi-autonomous procedure. The concepts described herein are also useful for manual surgical procedures, such as manual laparoscopy.

In general, a system includes an image capture device such as a camera for capturing images of a treatment site, an image display for displaying the images, and at least one processor for receiving the images and which includes a memory storing instructions for executing the various features described here. User input devices may also be included, such as, without limitation, vocal input devices, manual input devices (e.g. buttons, touch inputs, knobs, dials, foot pedals, eye trackers, head trackers etc.). In some configurations, the system is used with a robot-assisted surgical system, in which case the input devices may be part of the surgeon console used by the surgeon to give input to the surgical system to command movement and actuation of surgical instruments carried by robotic manipulators.

In accordance with the disclosed concepts, assistance is provided to the user via overlays indicating any one or any combination of the following:

Suture Path

Suture Needle Target Output (tissue entrance and/or exit point)

Suture Spacing and Positioning Assessment

Suture Placement Recommendation

The following describes features for generating the above-mentioned overlays. A system incorporating the described features may make use of one of the features, or more than one of the features in various combinations.

Suture procedures often make use of a curved suture needle held by an instrument (needle holder). In a first feature, the expected path of the curved suture needle when it is rolled about the axis of the distal tip of the needle holder can be overlaid on the endoscopic view to provide a predictable path that allows path planning and improved suture accuracy. The needle path will be an arc defined by the instrument tip axis, the needle geometry, and the needle position and orientation in the jaws, which can all be obtained using computer vision. Path planning can be further improved by also estimating where the needle will enter the tissue (where the suture will be placed). Tissue position relative to the instrument can be estimated to allow determination of the point where the needle path will intersect with the tissue.

Figure 2A:
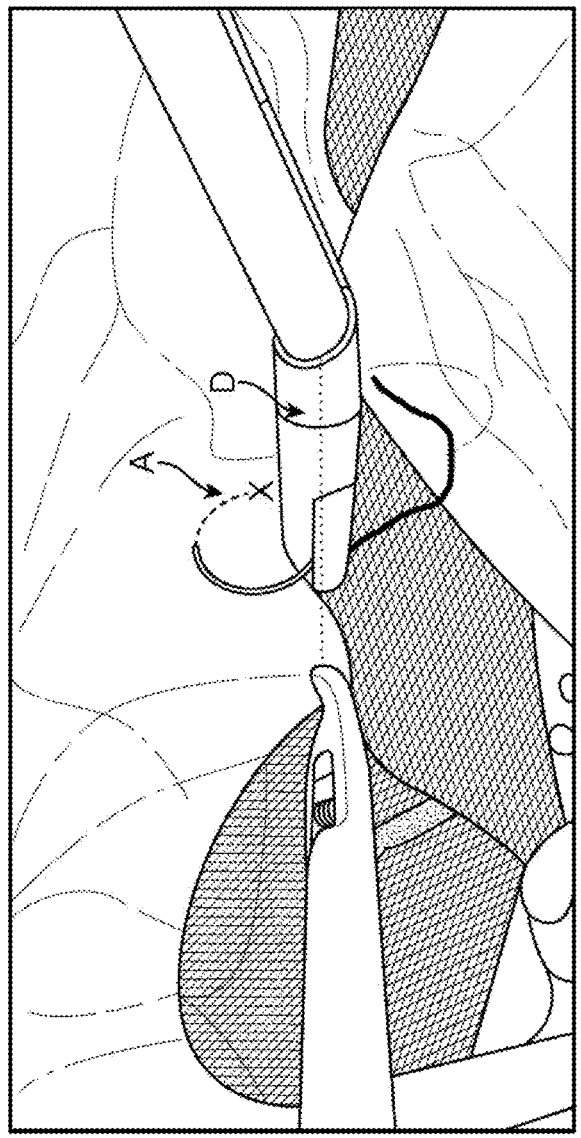
FIG. 2A shows an image of a treatment site as captured by an endoscopic camera during a procedure for suturing a surgical mesh in place, and illustrates overlays indicating the expected path of the suture needle, and the axis of the distal tip of the needle holder.
Figure 2B:
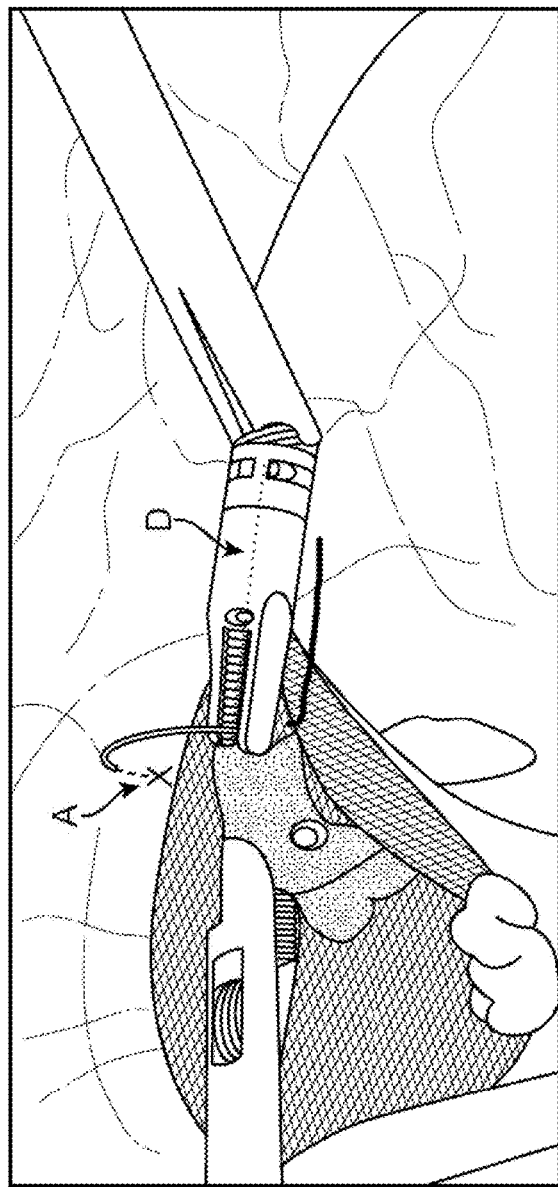
FIG. 2B is similar to FIG. 2A, but further shows the needle entry location.
Figure 3:
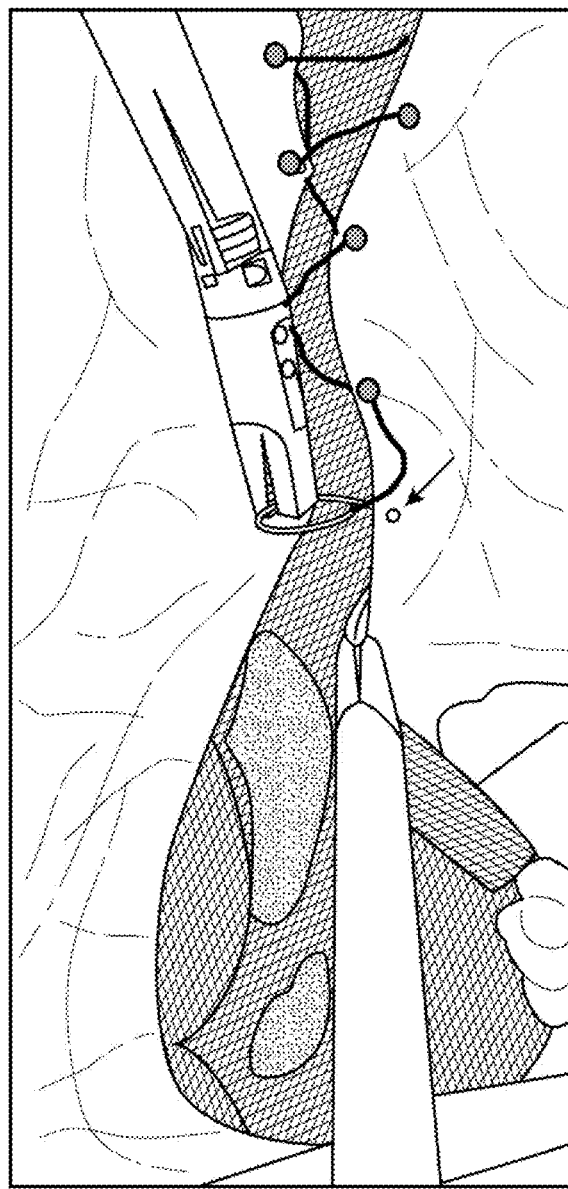
FIG. 3 is similar to FIG. 2B but shows overlays marking the location of previously-placed sutures as well as the target exit for the suture in the process of being placed.

A representation of the user interface and the progression of the feedback provided to the user are shown in the FIG. 2A-5 sequence of images using the endoscopic view of a hernia in the process of being closed. In FIGS. 2A-2B, the axis of the distal tip is shown with a dotted line D, the predicted needle path with a dashed arc A, and the tissue entrance location with an "X." Using this feature, the surgeon would position and orient the instrument such that the tissue entrance location is at the desired point, then roll the distal tip of the instrument to move the needle along the predicted path until the needle enters the tissue at that point.

The next portion of the suturing task is to pass the needle through the tissue to be approximated. In this task the needle may not be entirely visible, making it difficult to predict where the needle will exit the tissue. In a second feature (which as mentioned may be combined with the first embodiment, or any or all of the other disclosed features), the expected exit point for the needle can be overlaid on the endoscopic view to improve the accuracy of this task by again using knowledge of the needle path and tissue location. In the representative image of FIG. 3, the predicted needle exit point from the issue is displayed with an "o" (a circle with a transparent interior; also marked with a white arrow in the figure for purposes of identifying the circle to the reader of this application) and previous suture sites (e.g. entry/exit points in the tissue) are identified with filled dots ("●").

The surgeon may have a desired spacing between sutures for the particular anatomy and surgical task. Where the system is configured to detect or keep track of previous suture sites as discussed in the previous paragraph, the system could be configured to perform any one or combination of the following based on those sites:

Measure the distance between previously placed sutures

Notify the surgeon if actual spacing deviates from desired spacing exceeds a predetermined maximum acceptable suture-to-suture spacing stored in the system's memory; the surgeon may want to place another suture if the distance is too large Measure the distance from the suture to the nearest edge of the tissue, where the edge is identified to the system by a user or determined by the system using computer vision Notify the surgeon if the actual distance from the suture site to the tissue edge is at or above a predetermined acceptable minimum margin stored in the system's memory; too small of a distance increases the likelihood of a tear when the suture is tensioned Indicate where the next suture should be placed to achieve a) the desired distance from the adjacent suture and b) the desired distance from tissue edge. The target distances to be used for this feature are preferably predetermined or specified by the user and stored in the system's memory, and then indicated on the display using an overlay during suturing.

Figure 4:
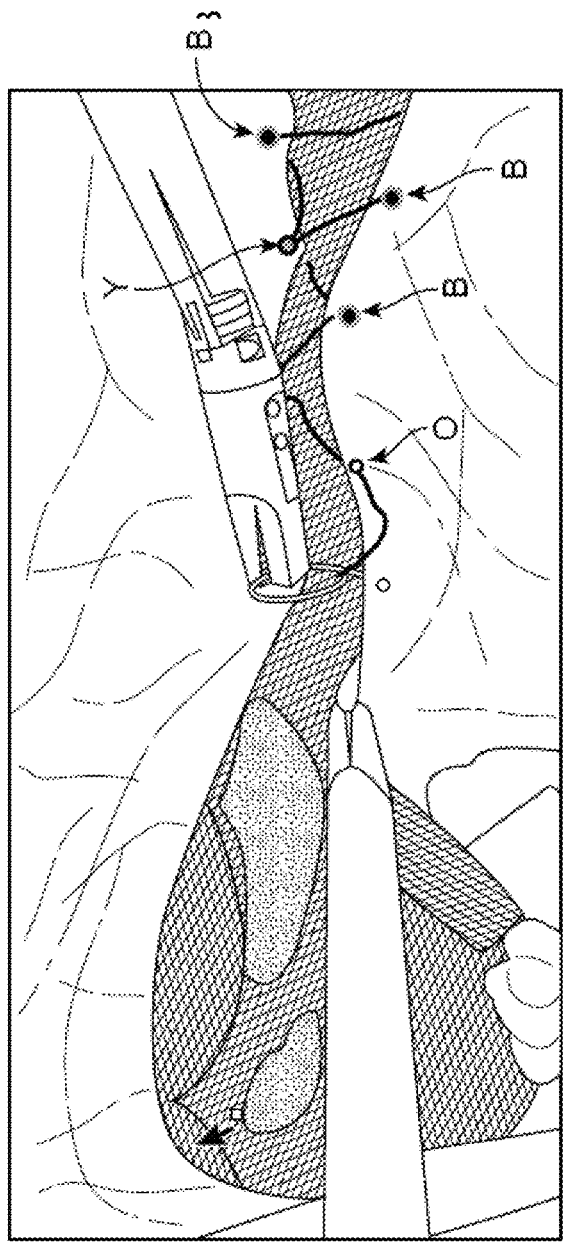
FIG. 4 is similar to FIG. 3, but shows overlays indicating sutures that may be closer than a predetermined target distance from a tissue edge, indicating sutures that may be closer than a predetermined target distance from an adjacent suture, and indicating sutures that are at an acceptable distance from a tissue edge and from adjacent sutures.
Figure 5:
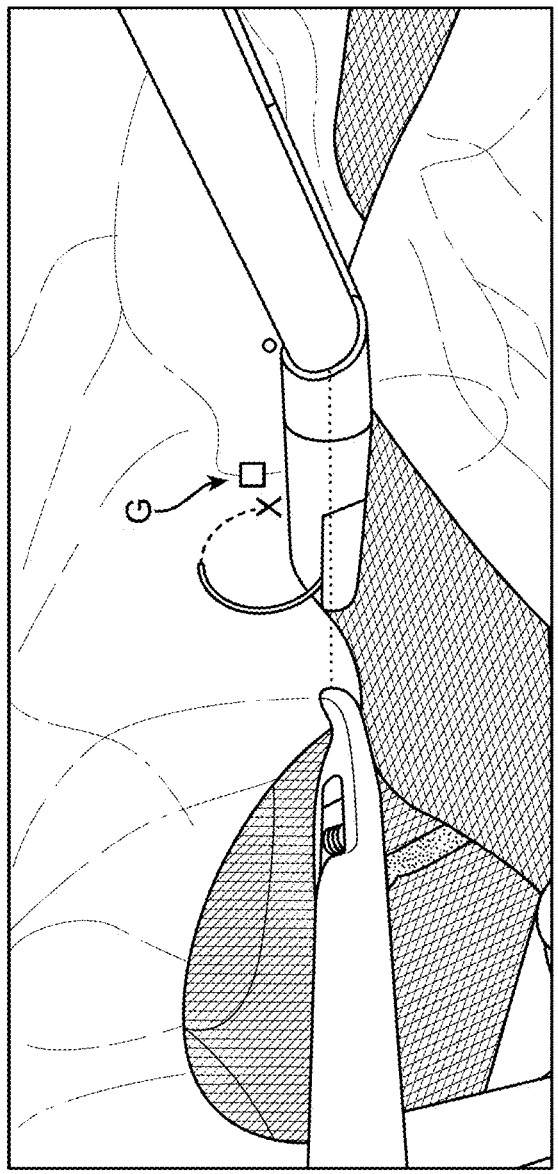
FIG. 5 is similar to FIG. 3 but includes an overlay marking a recommended suture site.

Representative implementations of the suture position detection features on the endoscopic overlay are illustrated in FIGS. 4 and 5. In FIG. 4, one suture has been determined by system to be too close to the edge of the tissue or, more specifically, below the predetermined minimum margin from the edge of tissue. It is identified to the user using an overlay (see the suture marked with yellow dot Y). One suture has been determined by the system to be too far from the adjacent suture or, more specifically, above the predetermined maximum suture-to-suture spacing. It is identified to the user using an overlay (see the orange dot O). Three sutures are determined to have been placed with acceptable distances between sutures and tissue edge. Overlays are used to identify these to the user (see blue dots B).

In FIG. 5, the system displays an overlay marking the suggested position for the next suture. In determining where to place the overlay, the system which takes into account desired a) spacing between adjacent suture, b) distance from tissue edge, and c) tolerance for both measurements. Is this figure, the overlay is in the form of the green box G. In a basic implementation of this feature, the surgeon would position and orient the instrument tip such that the predicted tissue entrance location (X) is positioned over the suggested suture location (square G). Once the overlays/icons are in place, the surgeon would execute the needle throw by rotating the distal instrument tip using the overlays as a guide.

The tissue edges and suture locations could be automatically identified by the system using computer vision, specifically delineated by the user, or may be identified based on slight cueing input from the user: "Move the instrument to the edge and click" or "Move the instrument to the suture location and click".

The acceptable spacing between sutures and between the suture and tissue edge could be automatically identified for the particular anatomy and procedure, specifically delineated by the user, or may be identified based on slight cueing input from the user. The system may include a database that stores predetermined acceptable minimum margins and predetermined maximum suture-to-suture spacing per procedure type, tissue type, surgeon preference etc. The user or surgical team may be prompted at the outset of a procedure to set such margins and distances to be used by the features using a user input. Machine learning may be used to teach the system the acceptable ranges of margins and distances, which again may be categorized by procedure type, tissue type, surgeon preference, etc.

To enable the suture-assistance features in a system, intelligent scene cognition may automatically identify that a suturing task is occurring, and enable the features upon doing so. For example, the system may recognize any one or more of the suture device (e.g. suture applier or needle holder) the suture needle, the suture etc. from the image data captured of the treatment site. Alternatively, or in addition, the user may enter a command instructing the system to engage the suture-assistance features (e.g. entering a suturing mode). As yet another example which may be used alone or in combination with the others, a robotic surgical system employing the described features may enter into a suturing mode when recognizing that an instrument used for suturing has been engaged to a robotic manipulator (e.g. using an identification feature such as an RFID tag on the instrument that is read by a receiver operable with the system to inform the system as to the type of instrument that has been engaged to the robotic manipulator).

A method and system for planning a suturing procedure may include the following steps, which are depicted in FIG. 1.

In an initial step 10, tissue edges to be sutured are identified. (May be un-approximated tissue or partially approximated). Edges may be identified or tagged relative to the endoscopic image in one or more of a variety of ways. As a first example, a user viewing the endoscopic image can identify the edges to the system. Non-limiting examples for this include:

Touching the areas on a touch screen displaying the scan (which as mentioned may be a real time image of the site) using a finger or stylus.

Navigating a physical pointing device, which may be a medical instrument, to the edges, to identify the edges to the system. In this example, the position of the instrument may be identified using computer vision that "sees" the medical instrument in the image and records its position with respect to the image, or, if the medical instrument is maneuvered by a robotic manipulator it may use kinematic data from the robotic system or some combination of image data and kinematic data.

Navigating a virtual pointing device that is shown on the image display, such as an arrow icon, using a user input device such as a mouse, touch pad, eye tracker, head tracker, multi-degree-of-freedom input device, the input device used to control manipulators of a robotic surgical system.

Each of the above examples may optionally include a subsequent step of confirming the locations to the system using a confirmatory input such as a voice command, button press, foot pedal press, or some other form of input. As a second example for identifying edges, computer vision may be used to recognize the edges. In this example, the system might generate graphical overlays (e.g. highlighting, shading, bounding, arrows, etc.) marking the regions it has identified as being potential edges of the type the user is seeking to identify. As a subsequent, optional, step, the user may be prompted to confirm that the marked regions are edges to be accounted for in the suture planning and application. The types of user input that could be used for this purpose include but are not limited to those discussed above. In a third example for identifying the edges, the user might use the input methods discussed above to identify a region to the system, and the system might then perform image processing to identify the edges within the identified regions.

In a subsequent step 12, a suturing plan is created by tracing edges, a plan is automatically created by the system and displayed to the user 14 for adjustment and/or approval 16a/16b using user input.

Receive user input approving the plan

Execute the plan as discussed in the feature descriptions set forth above.

What is claimed is:

1. A medical treatment method comprising the steps of
positioning a suturing instrument at a treatment site in a body cavity, wherein the suture instrument has a proximal part with a first longitudinal axis and a distal part with a second longitudinal axis, jaws on the distal part, and a suture needle having a suture thereon grasped by the jaws, the suture needle having a needle tip;
moving the suturing instrument to an articulated position such that the first longitudinal axis and the second longitudinal axis are not axially aligned;
capturing a digital image of the treatment site such that the digital image includes the distal part of the suturing instrument in the articulated position and the suture needle;
displaying the digital image on an image display;
performing computer vision analysis of the digital image, and based on the computer vision analysis, recognizing the suture needle and the distal part of the suturing instrument in the digital image;
based on the computer vision analysis, determining (i) a position and orientation of the second longitudinal axis, and (ii) an orientation of the suture needle in the jaws;
displaying an axis overlay on the digital image displayed on the image display, the axis overlay representing the position and orientation of the second longitudinal axis;
based on the position and orientation of the second longitudinal axis and the orientation of the suture needle in the jaws, determining a pathway along which the needle tip will travel if the distal part of the suturing instrument is axially rotated about the second longitudinal axis;
displaying a pathway overlay on the digital image displayed on the image display, the pathway overlay depicting a curved pathway from the needle tip towards the tissue along which the needle tip will travel if the distal part with the suture needle grasped by the jaws is rotated about the second longitudinal axis.

2. The method of claim 1, further including the steps of:
determining a predicted exit point for the needle with respect to the tissue based on geometry of the needle and position and orientation of the needle at the treatment site; and
displaying an exit point overlay on the digital image displayed on the image display, the exit point overlay representing the exit point.

3. The method of claim 1, further comprising:
receiving input identifying a location of a tissue edge at the treatment site, the tissue edge being an edge to be approximated with another edge in a suturing operation;
receiving input identifying a location of a suture placed in tissue at the treatment site;
based on computer vision analysis of the digital image, measuring a distance between the tissue edge and the suture location;
determining whether the distance is below a pre-determined minimum suture-to-edge distance;
if the distance is below the predetermined minimum suture-to-edge distance, displaying a first overlay type on the display of the image on the image display;
if the distance is not below the predetermined minimum suture-to-edge distance, displaying a second overlay type on the display of the image on the image display, the second overlay type having a different visual appearance than the first overlay type.

4. The method of claim 1, wherein the suturing instrument is an articulating suturing instrument.

5. The method of claim 1, wherein the suture needle is a curved suture needle.

6. The method of claim 4, wherein the suturing instrument is an articulating needle holder.

7. The method of claim 5, wherein the suture needle is a curved suture needle.

8. The method of claim 1, wherein the method further includes, based on the computer vision analysis, determining the geometry of the suture needle, and determining the pathway along which the needle tip will travel is determined based on the determined geometry.

* * * * *